United States Patent [19]
Duvall et al.

[11] 3,872,434
[45] Mar. 18, 1975

[54] DYNAMIC SAMPLE-BY-SAMPLE AUTOMATIC GAIN CONTROL

[75] Inventors: Dale R. Duvall, Fort Worth; Marion W. Neff, Arlington; Paul D. Lawson, Irving, all of Tex.

[73] Assignee: Recognition Equipment Incorporated, Irving, Tex.

[22] Filed: Dec. 5, 1973

[21] Appl. No.: 421,814

[52] U.S. Cl. ......................... 340/146.3 AG, 178/7.6
[51] Int. Cl. .............................................. G06k 9/02
[58] Field of Search ........ 340/146.3 AG, 146.3 AH, 340/146.3 D, 146.3 MA; 178/7.6

[56] References Cited

UNITED STATES PATENTS

| | | | |
|---|---|---|---|
| 3,665,326 | 5/1972 | Sullivan | 340/146.3 AG |
| 3,723,970 | 3/1973 | Stoller | 340/146.3 AG |
| 3,800,078 | 3/1974 | Cochran et al. | 340/146.3 AG |

*Primary Examiner*—Gareth D. Shaw
*Assistant Examiner*—Joseph M. Thesz, Jr.
*Attorney, Agent, or Firm*—Richards, Harris & Medlock

[57] ABSTRACT

Gain control for an optical reader having a scanned photocell array producing a multiplexed analog signal stream by cyclically sampling the signals on channels leading from the cells in the array. A memory stores digital coded words, one word for each given channel with each word representative of the response characteristics of a given channel. A multibit digital-to-analog converter receives the multiplexed signal. In synchronism with multiplexing the signals, gain control words are read from memory and each converted to an analog gain control voltage which is applied to the converter in coincidence with the appearance at the converter of the signals from the given channel to which the word corresponds to produce a multiplexed digital stream at the output of the amplifier independent of differences in responses of the channels to the same field of view.

5 Claims, 9 Drawing Figures

DYNAMIC SAMPLE-BY-SAMPLE AUTOMATIC GAIN CONTROL

This invention relates to optical character recognition, and more particularly to automatic control of the levels of signals from a scanned array of photocells while converting the signals to a multi-bit binary code for application to a decision unit.

BACKGROUND OF THE INVENTION

In optical character recognition, an array of photocells, such as a linear array, may be positioned transversely to a path of moving documents bearing alphanumeric data to be read. Variations in reflectance of the documents may be sensed across a printed line of such data by repeatedly scanning output signals from the array of photocells at a very high rate as the document moves past the photocells.

Documents may have a wide range of background. Background is the typical light reflectance level of the document in the proximity of the printed information. Signals produced by the photodetectors are appropriately termed video signals because the analog output signals from a photodetector array may be sampled at a very high rate and multiplexed for single channel processing. Thus a video signal as referred to herein is an analog signal whose level is proportional to the light level observed by the photodetector.

Because of variations in individual sensitivities of the photodetectors which may be selected, as well as the differences which may be inherent in the signal channels leading from the photodetectors, it is desirable that such individual characteristics be compensated so that signals from all the photodetectors ultimately have amplitudes which have the same reference point. Further, it is desirable that the reference point be dynamically adjusted in order to permit the system to accommodate variations in documents.

One approach to optical character recognition has been to use individual analog video amplifiers with an automatic gain control circuit which continually sets the full scale level upon the largest, i.e., whitest, video signal observed. By this approach, an amplifier is forced to keep its full scale output set on the video background level. After the signals pass through automatic gain controlled amplifiers, multiplexing and analog-to-digital conversion was performed using a fixed reference voltage.

There are serious disadvantages to such prior approaches. For example, such amplifier AGC circuit has time constants associated with the attack and release functions. A bright discontinuities on an observed document, i.e., brighter than the typical backgrounds, may cause the amplifier AGC to set the full scale value on the wrong value. This causes the resulting video signal to be converted into erroneous values during the release time of the amplifier. Further, when observing a horizontal line, the amplifier slowly releases, causing the line continuously to be scaled lighter and lighter until it effectively no longer is observed. Finally, every amplifier works completely independently of every other amplifier so that they are easily misled by the video signals not representative of the background. This causes false false to result in the video signals.

SUMMARY OF THE INVENTION

The present invention is directed towards a simple economical means for converting a group of analog video signals with unequal scale factors into a group of digital values with equal scale factors. The result is to be such that a group of video signals having different analog outputs while observing the same light level will be converted to the same value. Further, the invention is directed to a means for adjusting the conversion scale by the same percentage for all video signals so that the full scale output of the converter can be made to adapt itself to different video backgrounds.

In accordance with the present invention, the automatic gain control function (AGC) is performed in an analog-to-digital converter with the video signal amplification containing no AGC and wherein the amplification and multiplexing are done prior to the digital conversion.

More particularly, in accordance with the invention, there is provided an optical character recognition unit wherein a reference code is stored for each of a plurality of photocell channels and wherein the differences in the reference codes represent the differences in response characteristics of the various channels. The method comprises moving a document through the field of view of the photocells to produce analog signals representing variations in reflectance of the documents along a line perpendicular to direction of movement thereof. The photocells are scanned and the outputs are multiplexed to provide a single analog multiplex stream. Each element of the stream is then converted to a binary coded word by comparing each element to reference analog voltages dependent in part upon the reference codes to provide binary coded words for application to a decision means. The number of binary coded words indicative of a white background on the document are counted in each scan. A conversion scale is then modified for production of the reference analog voltages from all of the reference codes when the number of binary coded words indicative of the predetermined quality of background differs from a predetermined criteria.

In a more specific aspect, multi-bit parallel conversion means is connected to receive both the analog stream and a reference voltage. The reference voltage varies in dependence upon variations in the coded reference words. A coding unit produces a multi-bit output words representative of the output of each photocell in unique dependence upon the reference words for such cells stored in the memory unit. A background monitor is connected to sense the number of output words per scan which represent the background reflectance of the documents and produces the control signal. Means are then provided to increase and decrease the reference voltages when the control signal is below and above, respectively, predetermined limits.

BRIEF DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENTS

The invention involves two major components. The first is an analog-to-digital converter with a digital gain control memory. The second involves a background monitor and control circuitry.

The analog-to-digital converter functions in two different modes of operation. The first mode is a calibration mode which is employed only when the power is applied to place the system in operation. The second mode is the normal mode which is undertaken after the calibration and may continue so long as the power is not turned off.

In the calibration mode, the analog-to-digital converter converts the multiplexed video stream into seven bit binary words representative of the full scale value of each channel. This is accomplished by requiring all video channels to observe a white target of uniform reflectance which remains unchanged during the calibration cycle. The seven bit words, each representing the full scale outputs of a designated analog channel, are stored in a digital gain control memory.

In the normal mode, the function of an analog-to-digital converter is to convert the multiplexed analog video stream into multi-bit binary coded information. In this mode the analog-to-digital converter reference is set to a value equivalent to the full scale output of the video signal being converted. This reference is then changed at the multiplexer rate so that the reference value is unique to each video output as it is being converted.

A background monitor and control circuitry functions only during the normal mode of operation. Such background monitor observes the analog-to-digital converter output and determines if the video background is lighter or darker than the full scale outputs of each channel. If either condition exists, appropriate control signals are sent to the control circuitry. The control circuitry provides the signal to the analog-to-digital converter to adjust the full scale ouptuts of each channel by the same percentage until the outputs actually become representative of the observed video background.

FIG. 1

Figure 1:
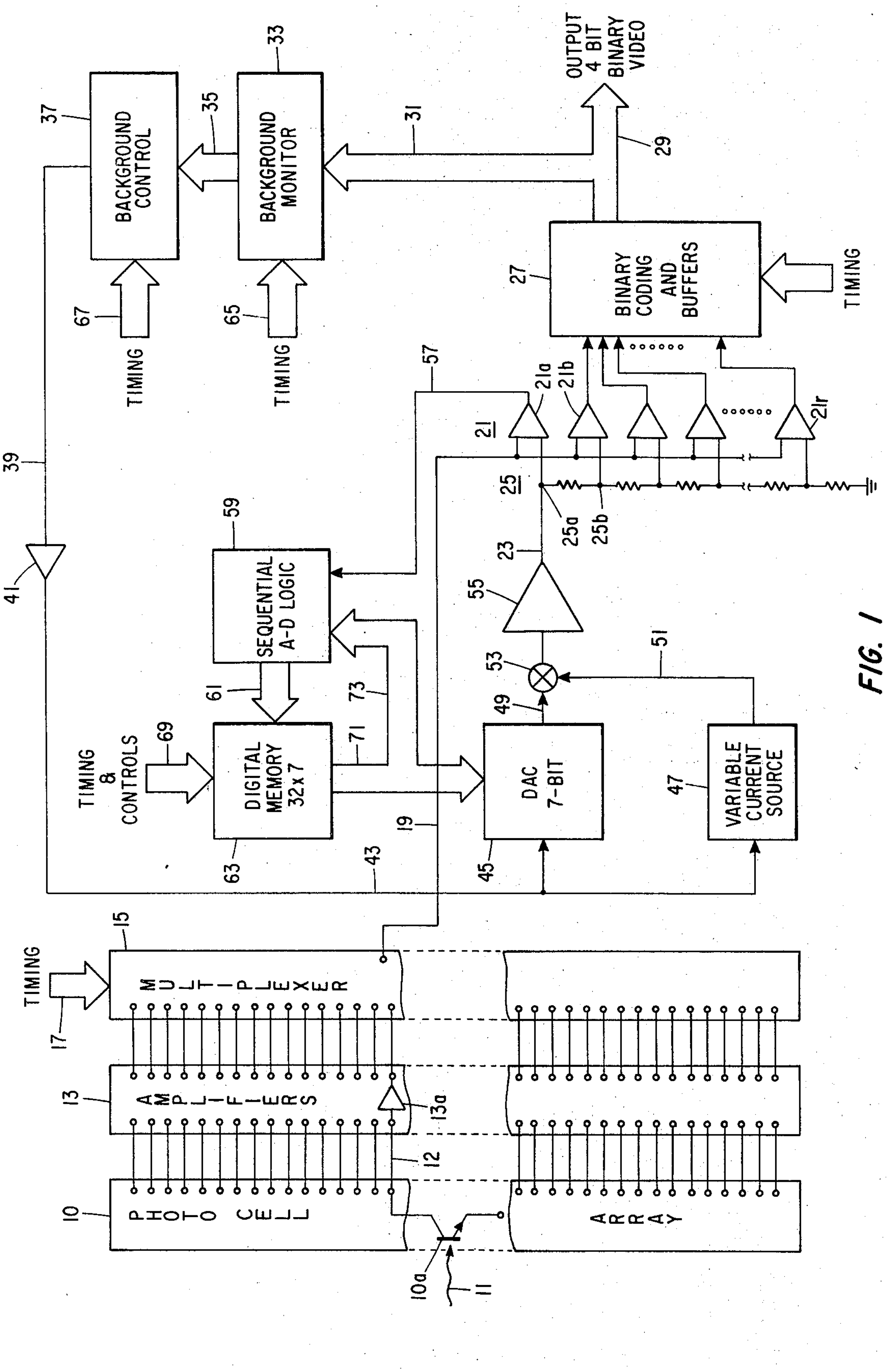
FIG. 1 is a block diagram of the system embodying the present invention.

The general arrangement of the system is illustrated in FIG. 1 wherein a photocell 10*a* in a multielement array 10 is responsive to light radiation represented by arrow 11. Only one photocell 10*a* has been shown. It will be understood that the array 10 will include a multiplicity of photocells. In the example to be here discussed, 32 such photocells will be employed in the array.

Light represented by arrow 11 impinging photocell 10a produces output current on line 12 proportional to the incident light. Line 12 is connected to an amplifier 13*a* in an amplifier bank 13. The multiple outputs of the amplifier bank 13 are then applied to the input terminals of a multiplexer unit 15. Timing and control signals applied to multiplexer 15 by way of channel 17 serve to sample the amplified analog signal from the photocells in array 10 and to produce on the output channel 19 a train of multiplexed analog signals. In the present example, the sample rate is at about 2.2 megahertz. Such analog signals are then applied to one input of each of a plurality of comparators in a comparator bank 21. In the present example, bank 21 includes sixteen comparators 21*a*–21*q*. The second input to each of the comparators in bank 21 is supplied by way of an analog reference signal appearing on line 23. Line 23 is connected to the upper end of a resistor ladder 25, the lower end of which is connected to ground. The second input to comparator 21*a* is connected to the top terminal of the resistance ladder 25, i.e., terminal 25*a*. The second terminal of comparator 21*b* is connected to the second tap on ladder 25, i.e., terminal 25*b*. Each of the remaining comparators is connected at its second input to successively lower terminals along the ladder 25.

Comparators 21*b*–21*p* are connected at their outputs to a binary coding and buffering unit 27. The binary coding unit 27 in a preferred embodiment performs a four bit parallel conversion of the elements of the signal stream from line 19. Output lines 29 are provided for connection to a character decision unit 30. Unit 30 may be of the type disclosed in U.S. Pat. No. 3,717,848.

The output lines from unit 27 are also connected by way of channels 31 to a background monitor unit 33. The background monitor unit is then connected by way of channels 35 to a background control unit 37. Unit 37 produces a background control signal on line 39 which is amplified by amplifier 41 so that a driving signal appears on line 43. Line 43 is connected to a seven bit digital-to-analog converter 45 as well as to a variable current source 47. The output lines 49 and 51 from units 45 and 47 connected to a summing point 53 and the signal sum is applied to a driving amplifier 55 to produce the reference signal on line 23.

Comparator 21*a* is connected at its output by way of channel 57 to an input to a sequential analog-to-digital unit 59. Unit 59 is then connected by way of channels 61 to a digital memory storage unit 63 which in the present embodiment has capacity of 7 × 32 bit storage capacity.

Timing signals are applied by way of channel 65 to the background monitor unit 33 and by way of channels 67 to the background control unit 37. Timing and control signals are then applied by way of channels 69 to the digital memory unit 63.

Digital memory 63 is connected by way of channels 71 to the digital-to-analog converter 45 and by way of channels 73 to the sequential analog-to-digital logic unit 59. Thus, the voltage on line 49 is a product voltage which changes at the multiplex rate. It is the product of the control signal on line 43 and the level represented by each seven bit word in memory 63. This product is then summed at point 53 with an offset voltage from line 51.

In the configuration of FIG. 1, the system is calibrated with the photocells in array 10 viewing a white background. For this white background, logic unit 59 stores in digital memory 63 one seven-bit word for each channel, which words characterize the response for each of the 32 channels leading to multiplexer 15. The seven bit word is generated beginning with the most significant bit and is generated one bit at a time at the multiplexing rate beginning with the most significant bit on channel 1 followed by production of the most significant bit on channel 2 and ending with the least significant bit on channel 31 followed by the least and final significant bit on channel 32. Thus the reference value is generated at the multiplexing rate.

Once the reference values have been stored in the memory 63, the normal operation may proceed utilizing for each channel the words stored in memory 63 to produce the voltage on line 23 which as above noted may change at the multiplexing rate.

FIG. 2

Having described the system configuration as illustrated in the block diagram of FIG. 1, a more detailed and comprehensive description will be given in connection with the circuit diagrams of FIGS. 2–5.

Figure 2:
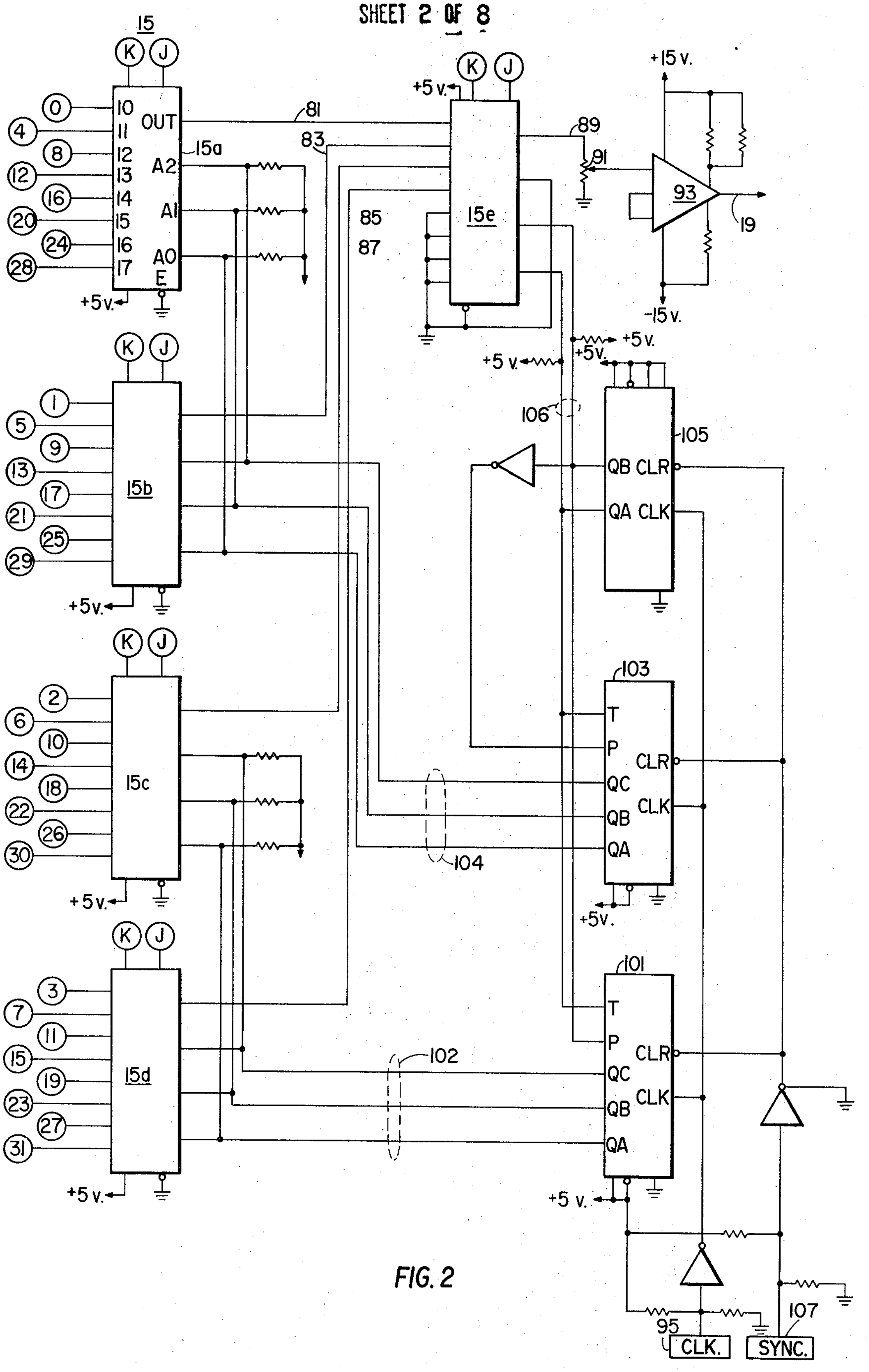
FIG. 2 is a detailed circuit of the multiplexer of FIG. 1.

In FIG. 2, multiplexer 15 is comprised of five discrete units 15*a*–15*e*. Units 15*a*–15*d* form a one-of-eight multiplexer having four output lines 81, 83, 85 and 87 which feed the multiplexer 15*e* which is a one-of-four multiplexer. The output line 89 for multiplexer 15*e* is connected by way of potentiometer 91 to the input of a high speed unity gain buffer amplifier 93. Multiplexer 15 is operated under the control of a signal from a clock 95. The clock signal is applied to counters 101 and 103 for the sequential addressing of the video signals which appear on terminals 0–31 at the inputs of multiplexer units 15*a*–15*d*. Control is by way of lines 102 and 104 thereby to produce one-out-of-eight multiplexing signals which are applied to multiplexer 15e. Counter 105 is a four bit synchronous counter which, by lines 106, addresses multiplexer 15*e* so that the signals on lines 81, 83, 85 and 87 appear as a single stream on line 89. Thus, the signals from photocell array 10, after amplification, appear as a serial stream on line 19.

A sync signal is produced by source 107 and thus is applied to counters 101, 103 and 105 to make certain that the multiplexer 15 initiates operation each time in the proper sequence. The sync pulse is generated in cell 31 time and, because the counters 101, 103 and 105 are synchronous, is acknowledged in cell 32 time.

It will be recognized at this point that the components of the system, including the photodiode array 10, amplifiers 13 and multiplexer 15, FIG. 1, form in effect a self scanned array. In the present embodiment, each photocell resolves a 6 milinch × 6 milinch zone whereby the 32 photocells view a vertical slice across a line of information and also a portion above the line and a portion below the line. It will be assumed, for the purpose of this description, that the field viewed by the array of photocells is in registration with a line of print the height of which is less than the height of the field of view.

FIG. 3

Figure 3:
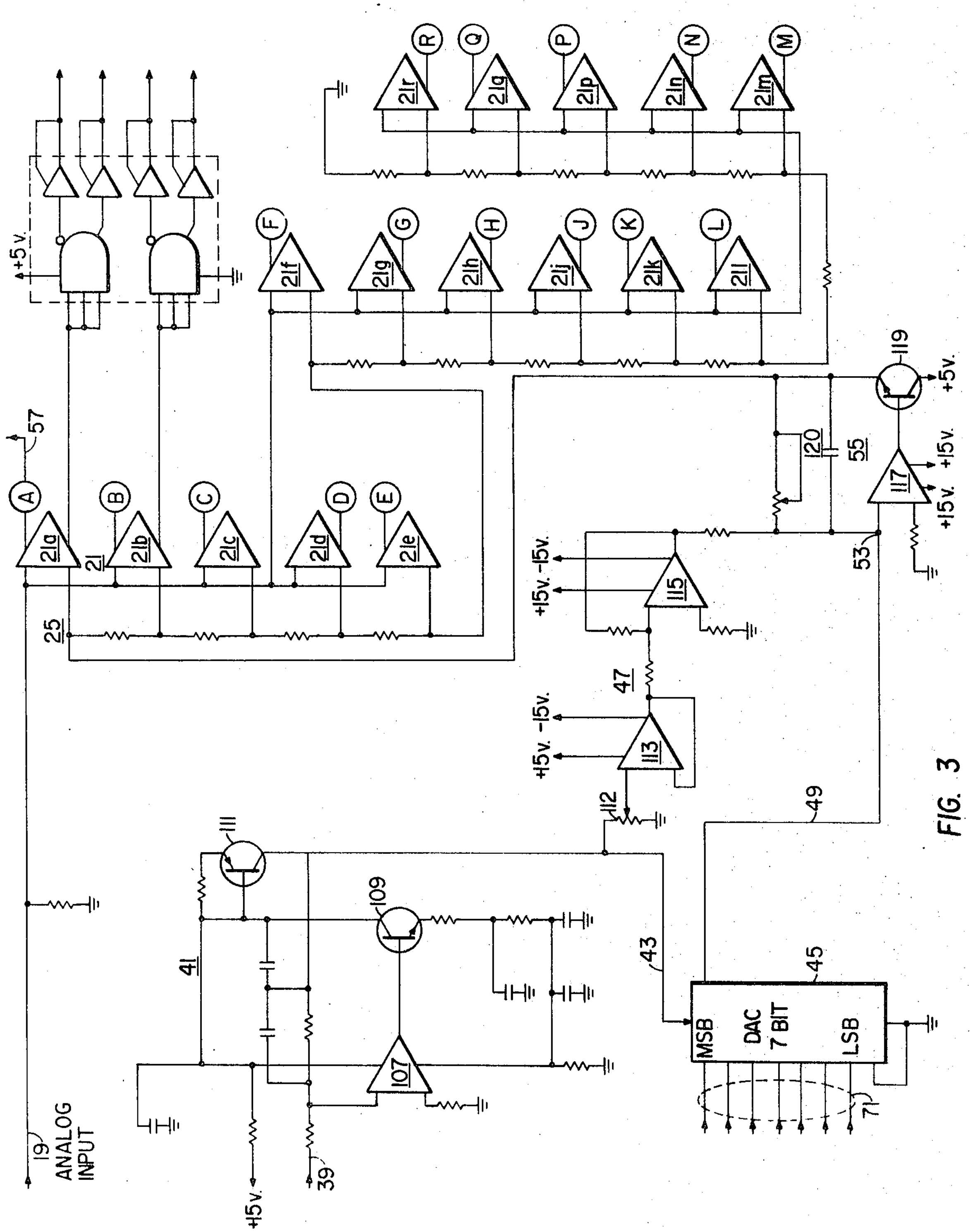
FIG. 3 is a detailed diagram of the normal signal channel from unit 45 through unit 21 of FIG. 1.

FIG. 3 details portions of FIG. 1 including DAC 45, source 47, amplifier 55 and comparators 21. The analog stream appears on line 19 connected to one input of each of the comparators 21.

The background control signal is applied to the system by way of line 39. The signal on line 39 is treated by an input buffer-amplifier unit 41 comprising operational amplifier 107 and the circuits of transistors 109 and 111. The buffer unit 41 serves to multiply the signal on line 39 by a factor (−1). Thus, the buffer serves merely as an inverter and an isolation unit while enhancing the drive capacity of the signal so that the signal is capable of driving the multiplying digital-to-analog converter 45. The signal on line 43 is the multiplier input to unit 45. The multiplicand is applied to the unit 45 by way of lines 71. The signal on line 43 is also applied by way of an offset potentiometer 112 to the variable current source unit 47 which is comprised of operational amplifiers 113 and 115. The output of amplifier 115 is then connected to the summing terminal 53.

The driver amplifier 55 comprises an operational amplifier 117 and an output transistor 119. Line 121 is then connected from transistor 119 to the upper end of the resistor ladder unit 25. A feedback circuit 120 is variable to control amplifier 55.

Figure 4:
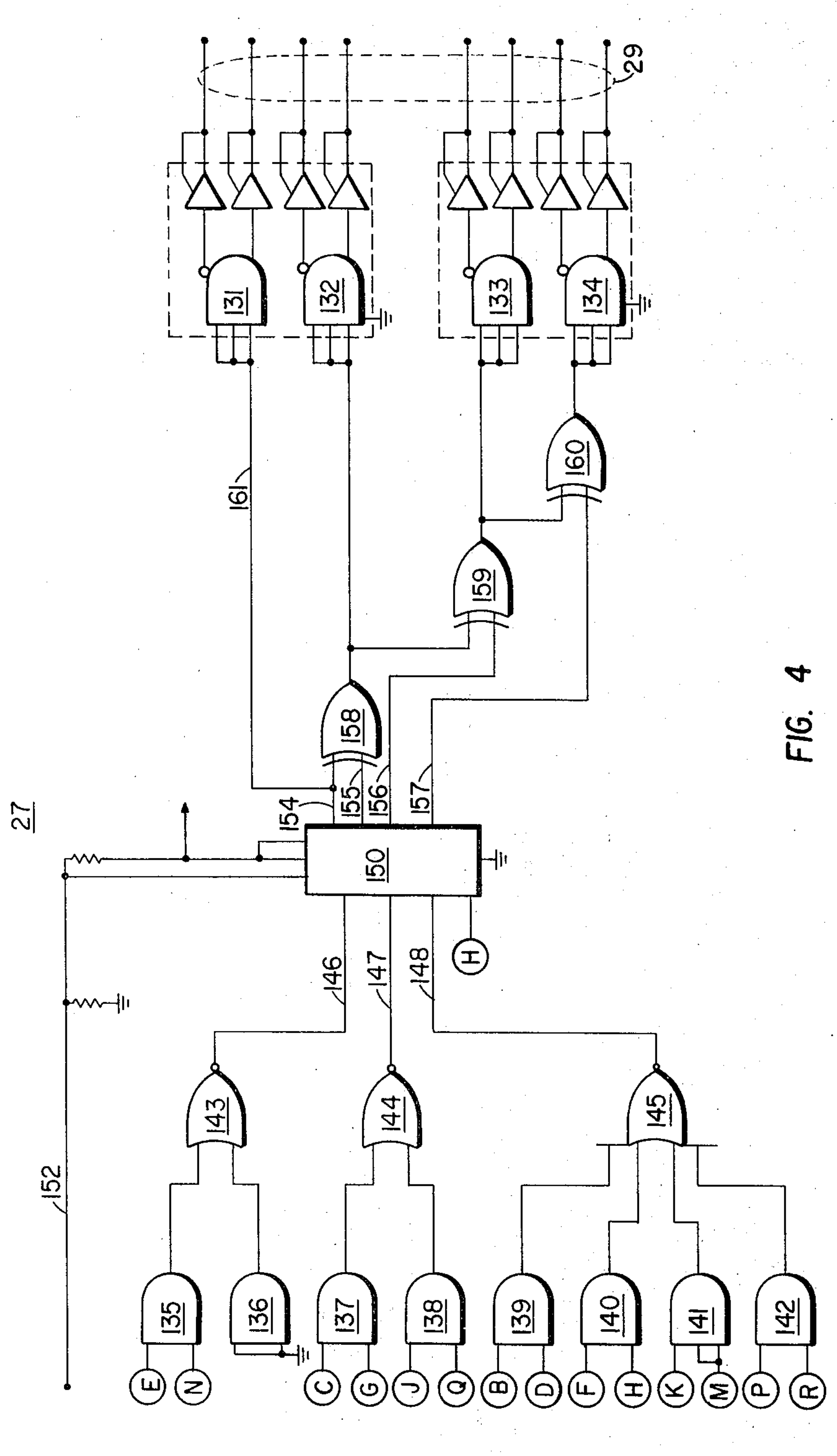
FIG. 4 is a detailed diagram of the unit 27 of FIG. 1.

The first comparator 21*a* is connected by way of output terminal A and line 57 to a read only memory unit shown in FIG. 4. The signal on line 57 is used during calibration.

The remainder of the output terminals which are labeled in FIG. 3 as terminals B–H, J–N, P and Q are connected to the binary coding unit 27 of FIG. 5, later to be described.

FIG. 4

The terminals A–H, J–N, P, Q and R of FIG. 4 correspond with terminals similarly identified in FIG. 3 and thus conduct signals from FIG. 3 for application to the circuit of FIG. 4. There is provided a four bit output from AND gates 131–134 which on channels 29 appear as differential line drive voltages. The most significant output bit of the four bit code appears on the top two lines from gate 131. The next most significant bit appears on lines 3 and 4 from gate 132. The least significant bits appear on the last two lines leading from gate 134.

Logic unit 27 comprises input AND gates 135–142. Gates 135 and 136 are connected to a NOR gate 143. Gates 137 and 138 are connected to a NOR gate 144. Units 135–138, 143 and 144 are packaged as a single unit and are commercially available and known as 74H51 and/or invert gates.

Gates 139–142 are connected through a NOR gate 145. Elements 139–142 and 145 comprise a four-one and/or invert gate unitarily packaged.

Output lines 146–148 lead to a storage latch 150. A clock signal on line 152 is applied to the clock input of latch 150. Output lines 154 and 155 are connected to the two inputs of an exclusive OR gate 158. The output of OR gate 158 and the output line 156 are connected to the two inputs of an exclusive OR gate 159. The output of gate 159 and the output on line 157 are connected to two inputs of a third exclusive OR gate 160. Line 154 is connected by way of line 161 to gate 131.

OR gate 158 is connected to gate 132. OR gate 159 is connected to gate 133 and OR gate 160 is connected to gate 134. Gates 131–134 are connected as driver units rather than logic units.

Through operation of the system of FIG. 4, the signals appearing on lines 29 represent a four bit code of the amplitudes of the black/white character signals sensed by the photodiode array 10, FIG. 1, after modification, each in a manner peculiar to the characteristics of its own channel and all of them in dependence upon variations in the background of the document on which the characters appear. The four bit code thus produced may be employed by a recognition unit for identifying the characters scanned by the photodiode array. A suitable recognition unit may be of the type described in U.S. Pat. No. 3,717,848.

FIG. 5

It will be helpful at this point to recall that the memory unit 63, FIG. 1, operates in two different modes, i.e., calibrate and operate.

In the calibrate mode, differences in the responses of the 32 channel signals appearing on line 19, FIG. 1, are sensed and expressed as differences in seven bit words which are generated for storage in memory 63.

In the operate mode, the seven bit words are read from memory, converted to analog voltage and then used in the comparators 21.

Figure 5:
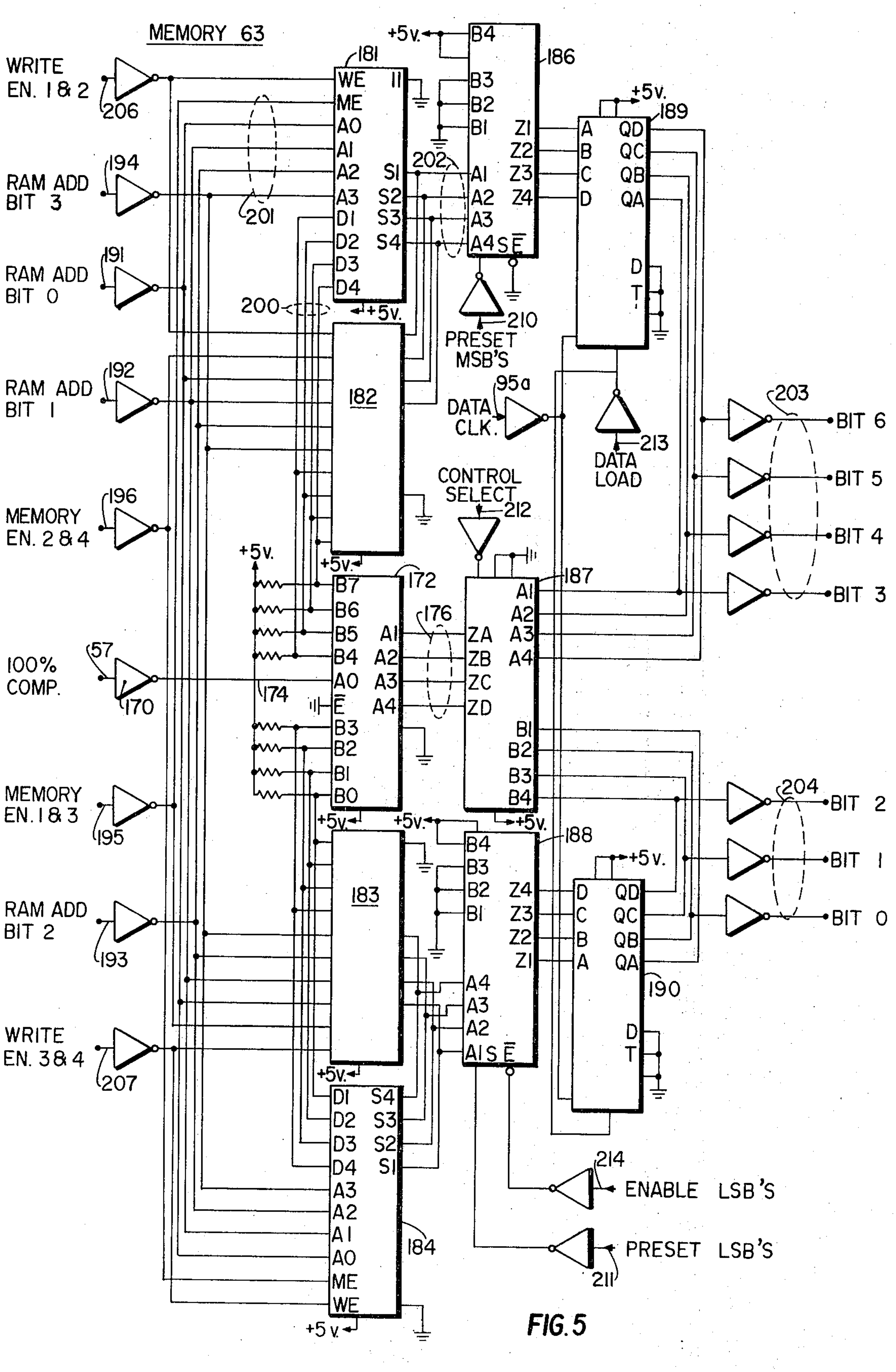
FIG. 5 illustrates the sequential logic 59 and digital memory unit 63 of FIG. 1.

In FIG. 5 one seven bit word is stored in memory units 181–184 for each of the 32 channels. Each stored word has a value representative of the individual channel response when the phototransistor array views a white background.

During calibration, a counter repeatedly addresses random access memories 181–184 through a five bit code applied to terminals 191–196. Terminal 191 carries the least significant bit of the address code. Terminal 195 carries the most significant bit of the address code. Terminal 196 carries the complement of the state on terminal 195.

Each of the random access memories 181–184 will store 16 four-bit words. Because of the necessity of storing 32 seven bit words, the four most significant bits of the first 16 words are stored in memory unit 181. The first four bits of the second 16 words are stored in unit 182. The last three bits of the first 16 words are stored in unit 184 and the last three bits of the last 16 words are stored in unit 183.

As to the generation of the words themselves, the system operates to address, by the states on line 174 and lines 176, the code 1000. These four bits are then applied by way of lines 200 to the data input terminals $D_1$–$D_4$ of units 181 and 182 which are connected in parallel. The address at which this word is stored is determined by the address on lines 201. At the same time, this word is output on lines 202 through data selector 186 and latch 189 as to appear as bits 3–6 on ouput lines 203, with zeros on output lines 204. The seven bit word is then applied to the converter 45, FIG. 1, and compared in comparator 21*a* with the 100 percent analog signal on line 19, FIG. 1. The four bits on lines 203 also are applied to unit 187 which applies the same bits as an address on lines 176 to the memory 172. If the comparator output appearing on line 57 is true, then it has been determined that the most significant calibration bit is a one and that the code 1000 is stored at word location 1 in memory unit 181. If the state on line 57 is false, then it has been determined that the most significant bit in the first word is not a 1 but is a 0. Therefore, the word that is written in the first location is a 0100.

The same procedure is then followed for the second word as determined by the address on lines 201 as the counter feeding lines 191–195 continues its operation. This is continued until the most significant bit in each of the 32 words is stored in units 181 and 182.

Thereafter, the same procedure is followed to determine the second most sigificant bit in each of the words. Next, the system cycles to determine a third and a fourth, then the fifth, sixth and seventh bits of each word until all of the bits characterizing the responses of each of the 32 channels have been stored in random access memories 181–184. Line 195, the most significant bit line, is connected to the memory enable inputs of units 181 and 184. Its complement appearing at terminal 196 is connected to the memory enable inputs of memory units 182 and 183. Terminal 206 is connected to the write enable inputs of memory units 181 and 182. Its complement appearing on terminal 207 is connected to the write enable inputs of memory units 183 and 184.

In initiating calibration, the most significant bits are preset by applying preset pulses to terminals 210 and 211. Such preset levels applied to units 186 and 188 apply, through latches 189 and 190, the initial code word 1000000 during the first 32 clock pulses of the calibrate cycle. Such an output code is generated because in units 186 and 188 the upper terminals $B_1$–$B_4$ are prewired normally to give a 1000010000 code output. More particularly, terminal $B_4$ is connected to +5 voltage and $B_1$, $B_2$ and $B_3$ are connected to ground. Further, the corresponding terminals in unit 188 are similarly connected. However, during calibration steps in which the first four bits of the gain words are selected, the unit 188 is disabled by application of a control state to terminal 214 forcing all zero outputs from unit 188.

After the initial 32 clock bits, the preset signal is removed from terminals 210 and 211 and the system automatically cycles thereafter.

During the first 4 × 32 calibration clock pulses, a select signal is applied to terminal 212 so that the most significant bits issuing from unit 186 will be used to select the proper control words by means of unit 172 for storage in memories 181 and 182. During the last 3 × 32 calibration clock pulses, the select signal is removed from terminal 212 to select the proper control words by means of unit 172 for storage in memories 183 and 184.

In the operation mode, the words stored in memory units 181–184 remain unchanged for so long as the system power remains on.

A clock signal is applied to the latches 189 and 190 from terminal 95*a*. A data load signal is applied to terminal 213. A signal to enable the least significant bits is applied to terminal 214 during the last 3 × 32 calibration clock pulses.

In the operating mode, the addresses appearing at terminals 191–196 sequentially read out and cause to appear at terminal on lines 203 and 204 the bits comprising the 32 seven bit calibration words.

The operation of the circuit of FIG. 5 will now be traced briefly from a different point of view than set out in the immediately preceding explanation. Memory units 181–184 are random access memories. Unit 172 is a read only memory which may otherwise be described as a look up table. It is used in a manner such that the states on lines 174 and 176 comprise addresses. The five bit address may then be employed to read out of memory 172 any one of the desired bits to form the seven bit code word representative of channel response. Units 186 and 188 are data selectors. More particularly, when a high voltage state is applied to terminal 210, there appears at output terminals $Z_1$–$Z_4$ connected to input terminals A–D of unit 189 the set of bits either prewired in input terminals $B_1$–$B_4$ or the set of bits from units 181 and 182 appearing on input terminals $A_1$–$A_4$. The state on line 210 then selects one or the other of the sets of inputs A and B in unit 186. In a similar manner, voltage states on lines 211 and 214 enable the selection of the desired bits from the inputs $A_1$–$A_4$ or $B_1$–$B_4$ to appear at the inputs A–D of latch 190.

Latches 189 and 190 store and present at the outputs $Q_A$–$Q_D$ the states which are read through the selectors 186 and 188, respectively. The outputs $Q_A$–$Q_D$ from units 189 and 190 are then selected in unit 187 and fed to random access memory 172 as part of the address for selection of the desired bits to be stored in memories 181–184.

FIG. 6

Figure 6:
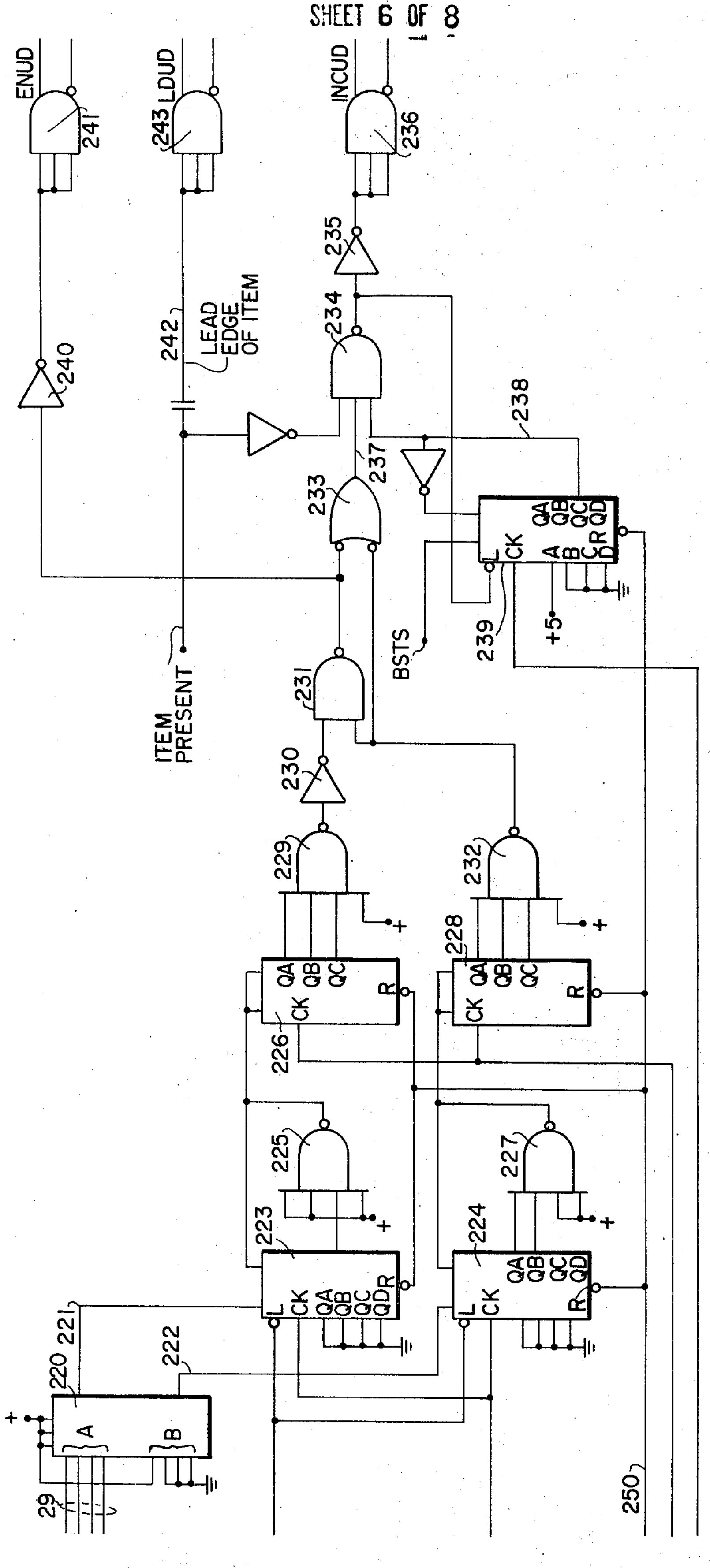
FIG. 6 illustrates background monitor unit 33 of FIG. 1.

Referring now to FIG. 6, the true set of four output lines leading from AND gates 131–134, FIG. 4, are connected to the inputs $A_0$–$A_3$ of a comparator 220. The B inputs of comparator 220 are connected at bit $B_0$ to +5 volts and $B_1$, $B_2$ and $B_3$ to ground. If the input code on lines 29 is equal to one, then the output 221 is high. If the B inputs are greater than A, then output line 222 is high. Line 222 is connected to the cell black enable terminal of a counter 223. Line 222 is connected to the cell white enable terminal of a counter 224.

Counter 223 has a clock sync signal connected to its load terminal to load a zero into counter 223 at the beginning of each scan. The counter 223 then increments each time the output line 221 from comparator 220 is true until counter 223 counts two such increments. It then applies an output signal by way of NAND gate 225 to a scan register 226. In a similar manner, counter 224 is loaded with a zero at the beginning of each scan and increments one until a count of three is reached in which case there is applied by way of NAND gate 227 a signal to scan register 228.

The $Q_A$, $Q_B$ and Q

CHCC outputs of scan register 226 are connected by way of NAND gate 229 and inverter 230 to one input of NAND gate 231. In a similar manner, the outputs $Q_A$–$Q_C$ of register 228 are connected by way of NAND gate 232 to an input of NAND gate 231. The outputs of NAND gates 231 and 232 are connected to the inputs of NAND gate 233. The output of NAND gate 233 is connected to one input of NAND gate 234 whose output is connected by way of inverter 235 to a driver NAND gate 236.

The second input line 237 to NAND gate 234 will be high whenever an item is present in the system and is to be read. The third input of NAND gate 234 is supplied by way of line 238 from a divide-by-ghree counter 239. Counter 239 increments one for each scan and divides by three so as to enable NAND gate 234 once every three scans.

The output of NAND gate 231 is connected by way of inverter 240 to the inputs of driver NAND gate 241. A signal on line 242 applied to the inputs of NAND gate 243 is rendered high when the leading edge of a mail piece enters the system.

By the comparison in unit 220 and the counters 223 and 224, there is produced at the output of inverter 230 a one state if the document background is too light. There is produced at the output of NAND gate 232 a one state if the background is too dark. Therefore, signals applies to the input of NAND gate 233 produce an output from NAND gate 236 which indicates that an up/down counter is to be incremented.

There is produced at the output of NAND gate 241 a signal indicating that the up/down counter is to be incremented up. There is produced at the output of NAND gate 243 a signal representing the fact that the up/down counter is to be loaded preparatory to a cycle of operation. A master clear line 250 is connected to the clear terminals of counters 223, 224, registers 226 and 228 and counter 239.

FIG. 7

Figure 7:
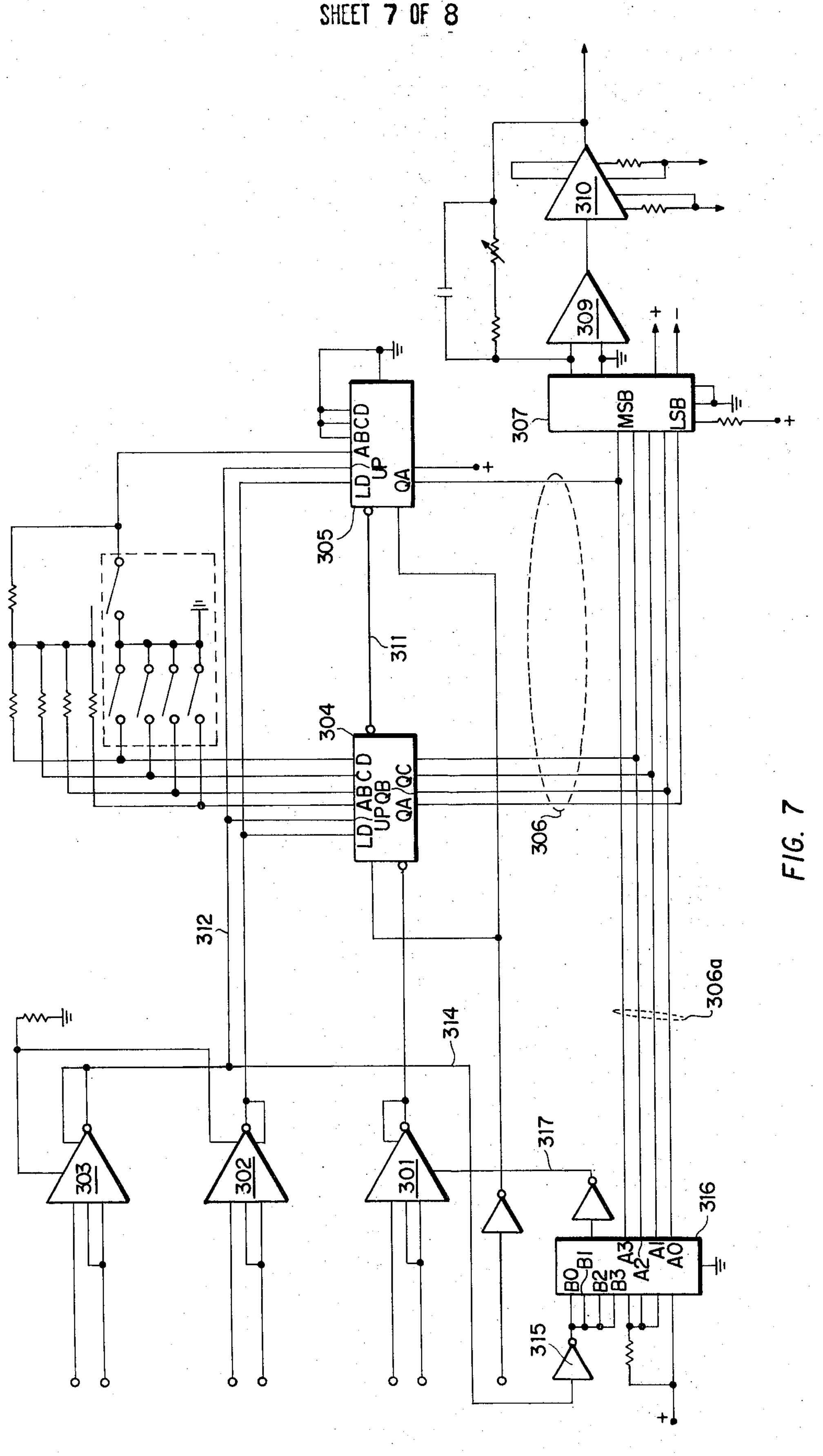
FIG. 7 illustrates the background control unit 37 of FIG. 1.

Referring now to unit 37, FIG. 7, three input line receivers 301–303 work in conjunction with a five bit counter comprised of units 304 and 305. An output code is produced from counters 304 and 305 and appears on lines 306. The output code is converted to an analog signal in converter 307 and modified or converted from a current output at the output of converter 307 to an analog voltage on line 308 by a current to voltage converter comprising an amplifier 309 and a buffer amplifier 310.

The operation is such that voltage states on the input lines leading to unit 301, one complementary of the other, indicate that a change is necessary in the output counter 304–305, i.e., the background is too light or too dark. If the background is too light or too dark, then the output of receiver 301 is applied to the count enable input of counter 304. Because of the connection 311 both counter units 304 and 305 are enabled to count up or down during the next clock time. The state on the input lines to receiver 303 determines whether or not the count moves up or down. More particularly, it will be noted that the output line 312 leading from receiver 303 is connected to the up/down terminals of counters 304 and 305.

The signal on the input lines to the unit 301 is in the form of pulses which may appear for only one clock cycle for every three complete scans through the digital memory 63 of FIG. 1. Thus, it provides an average of several sets of samples of the background value on the document being scanned. The output from the counters 304 and 305 is permitted to change only one count every three scans. Up/down receiver 303 is connected by way of line 314 and an inverter 315 to the input of a control unit 316 which is a four bit comparator. The comparator 316 operates to prevent the output from counter 304–305 from changing in response to an up signal beyond the maximum level or from changing downward beyond the minimum level when there is a down signal indicated by unit 303. This is done by applying the four most significant bits as they appear on line 306*a* to a first set of inputs of comparator 316. The output from unit 303 is applied to all of the second set of inputs of the comparator 316.

If an up signal appears at the output of unit 303 and if all of the line 306*a* are in a 1 state, then the condition for producing an inhibit output on line 317 is met and the receiver 301 will be inhibited so that the counters 304–305 will not be enabled.

In contrast, if a down signal is applied to receiver 303 and if the line 306*a* are all in their low states, then again the condition for producing the inhibit signal on line 137 is met and the counters will not count down further. Thus, the comparator 316 serves as a limiter for the range of the coded output on line 306.

FIG. 8

Figure 8:
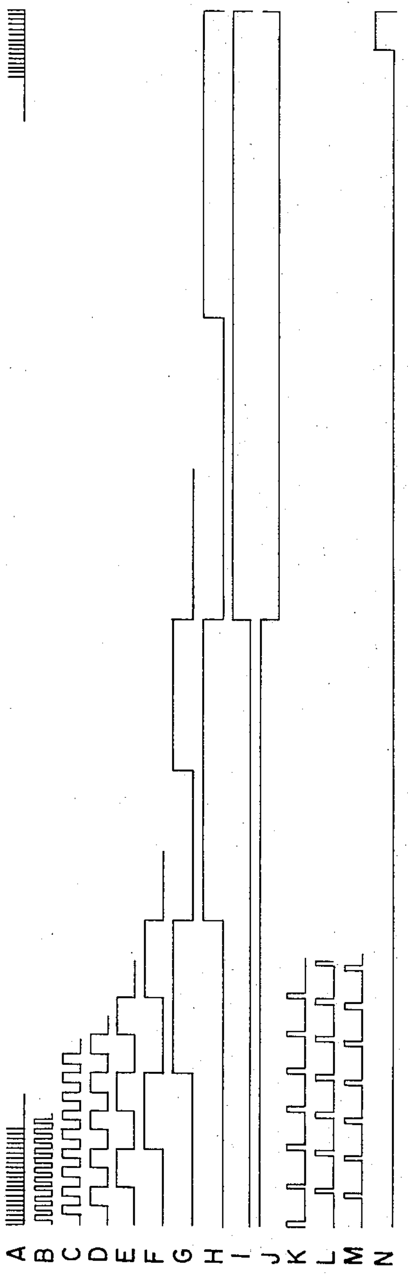
FIG. 8 is a general timing diagram of waveforms and control states employed in the system of the foregoing Figures.

Referring now to FIG. 8, the timing diagram has been illustrated which depicts the relative time occurrence of control and timing signals employed in the system.

Waveform A illustrates the output of a basic clock. In this embodiment, the clock provides output pulses at intervals of 59 nanoseconds.

Waveform B illustrates the system and data clock timing signal which is the basic clock of waveform A divided by two. Square wave pulses occur at intervals of 118 nanoseconds. The clock signals of waveform B are not utilized in the system directly but are employed to provide the control pulses of waveforms B–M.

Waveform C represents a clock control signal that is generated by dividing waveform B by a factor of two. Waveform C is not used directly but is utilized for the generation of other waveforms in FIG. 8.

Waveform D is the multiplexer clock signal. It is this signal that is applied to the multiplexer 15 of FIG. 1 by way of channels 17. Further, referring to FIG. 2, waveforms D represents the output of the clock 95.

Waveforms E–H represent successive divisions by a factor of two of the waveform D. Waveforms E–H are used to address the storage resistors 181–184 of FIG. 5. Waveform E is applied to terminal 191 of FIG. 2 and is the bit 0 address control for the storage registers. Waveform F is applied to terminal 192 and is the bit 1 address. Waveform G is applied to terminal 193 and is the bit 2 register address. Waveform H is applied to terminal 194 and is the bit 3 register address.

Waveform I represents waveform H divided by a factor of two. Waveform I is a memory enable control signal and is applied to terminal 195, FIG. 5. Waveform J is the complement of waveform I and is a memory enable signal applied to terminal 196.

By application of the waveforms D–J of FIG. 8, the control of the registers 181–184 is accomplished.

Waveform K is a data load control signal which is applied to latches 189 and 190 by way of input lines 213. This signal serves to load data from data selectros 186 and 188 into latches 189 and 190. The data is loaded at the intervals represented by the pulses in the waveform K. It will be noted that the waveform D and the waveform K have the same repetition rate. Similarly, waveforms I and M have the same repetition rate. The pulses occur at 469 nanosecond intervals.

The waveform L is an analog-digital clock which serves to load data into the buffer storage register of unit 27, FIG. 1. More specifically, the waveform L is applied by way of line 152, FIG. 4, to the buffer registers 150.

The waveform M is a write enable control signal which is applied to terminals 206 and 207 of FIG. 5.

Waveform N is a multiplex sync signal having one positive pedestal per scan interval. The single pedestal on waveform N is derived by decoding counter 31 from the waveforms E, F, G, H and I. Waveform N is the signal that is generated by unit 107, FIG. 2.

The waveforms thus far described represent the basic timing used in the entire system.

FIG. 9

Figure 9:
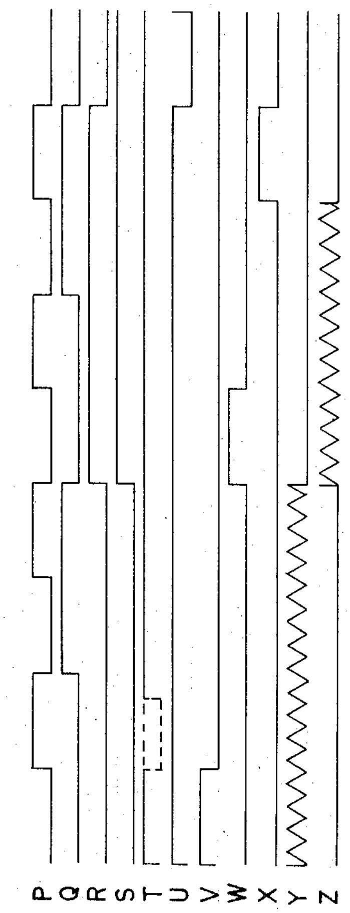
FIG. 9 is a timing diagram illustrating waveforms employed during the calibrate period.

The waveforms in FIG. 9 are the waveforms that are applicable during the calibrate mode. One scan interval in FIG. 8 is 15 microseconds in length. In FIG. 9, one scan interval of 15 microseconds occurs eight times during a calibration period of 120 microseconds. In FIG. 9 the waveform P is derived by dividing waveform I by a factor of 2. Waveform Q is derived by dividing the waveform P by a factor of 2. The waveform R represents another division of the waveform Q by a factor of 2.

Waveforms P, Q and R are employed for the generation of the preset MSB waveform V, the preset LSB waveform W, the inhibit waveform X, the WE1,2 waveform Y and WE3,4 waveform Z. Recall now, in connection with FIG. 5 and FIG. 1, the digital memory 63 is a seven by 32 bit storage unit. This unit is implemented in registers 181–184. Registers 181–184 each is a four by 16 bit storage register. The first four bits of the first word stored in memory 63 is stored in register 181 and the last three bits of the first word are stored in register 183. The waveforms employed in FIG. 9 are provided in order to enable registers 181 and 182 for four scan cycles and then to enable registers 183 and 184 for three scan cycles. Waveform Y represents the enabled period for registers 181 and 182. Waveform Z represents the enabled period for registers 183 and 184.

The waveform S serves to enable the least significant bits of data selector 188. Thus, the waveform S is applied to line 214, FIG. 5. Waveform V is employed to preset the most significant bits and is applied to the line 210, FIG. 5. The waveform V is employed to enable the least significant bit and is applied to line 211, FIG. 5. Thus, in accordance with the invention, the system is provided in an initial or start up operation means to calibrate all of the channels which lead to the output line 19 from the multiplexer 15. With all of the photocells viewing a white background, an initial or calibrate mode is instituted during a calibrate period of 120 microseconds as shown in FIG. 9. There are produced and stored the 32 seven bit words in memory 63. Each of the 32 words then represent the relative gain or relative response of the channels of the 32 channels in array 10. By this means, differences in the individual components including the 32 individual channels are compensated to a common level. Thereafter, at the end of the calibrate period, the system is placed in the run mode. The system operates in the calibrate mode each time the power is turned on to the system following a period of non operation. The calibrate mode is not used at any time other than at the start up.

During the run mode, the background monitor 33 and the background control 37 cooperate to produce on line 39 and thus apply to the converter 45 and the variable source 47 a variable voltage which represents the differences in the background level of various documents being scanned at any given time. Thus, dynamic gain control is provided which is employed to modify in the comparator 25 the gain level as represented by the gain words stored in memory 63. In order that it may be clearly understood, the data gain word stored in memory 63 is modified only during the calibrate period at each start up interval. However, the manner in which the gain words thus stored are utilized during the run mode is modified so that the converter 25 will produce an output which is compensated for various shades of background level. The background control consists of four primary sections. The first is the input video comparator 220, FIG. 6. The second revolves primarily around operations wherein up/down counters 304 and 305 are incremented. The third involves operation of scan registers 226 and 228, FIG. 6. The fourth section involves operation of the scan counter 239, FIG. 6.

The rules for background correction to the video data are:

1. Increment counters 304 and 305 down if the background is too dark. This operates if there are less than three zero level cells per scan for three consecutive scans. 2. Increment counters 304 and 305 up indicating that the background is too light. This takes place if there are less than two cells having a level of one per scan for three consecutive scans if, and only if, the increment down condition is not met.

The output corrections for the video electronics background control will occur every third scan as controlled by counter 239. In operation, the comparator 220 compares the four-bit video data from the video buffers in unit 27 to a binary count of one. When the input video is zero, the output on line 222 from comparator 220 will be high and will generate a white cell signal. When the input video signal to comparator 220 is equal to one, the line 221 will be high and generate a black cell signal. These signals then control the increment up counter 223 and the increment down counter 224. Counters 223 and 224 register the number of times the signals on lines 221 and 222, respectively are high. The output on line 221 goes high any time a black cell is encountered. If counter 223 registers two black cells per scan, then the output of NAND gate 225 goes high and disables counter 223. The background is then considered not to be too light.

The line 222 is high any time a white cell is encountered. If three white cells are counted per scan, then a signal is generated by the output of NAND gate 227 which serves to disable counter 224 and the background is considered not to be too dark. Both counters 223 and 224 are reset at the end of every scan by loading counters 223 and 224 to zero at the beginning of each scanned cycle, and registers 226 and 228 store the outputs of the counters 223 and 224, respectively. When the increment scan register 228 scores three consecutive highs from counter 224, FIG. 1, the four input NAND gates 232 decodes the outputs of the register 228 and generates a signal at the output of gate 232 which indicates that counters 304 and 305, FIG. 7, are to be incremented down, the background being too dark. The increment up scan register 226 operates the same except to develop an increment up signal at the output of NAND gate 229. When the output of NAND gate 229 is high, it is indicated that the background is not too dark and that the up/down counters 304 and 305 are to increment up.

The scan counter 239 counts scans and will not allow the background correction less than every third scan. When the scan counter 239 is at a count equal to three, the next increment up/down signal occurring any time during an item is present in the scan unit 10 to generate a signal at the output of the NAND gate 236 which indicates the direction that the counters 304 and 305 are to operate. If the output of NAND gate 236 is of one state, then counters 304 and 305 operate in one sense. If the output of NAND gate 236 is low, then counters 304 and 305 operate in the opposite sense.

Phototransistor 10*a* was Fairchild FPA 5751. Amplifier 13*a* was of the type generally represented by Texas Instruments Incorporated 75552 Dual Op Amp.

In FIG. 2 multiplexer units 15*a*–15*e* were Harris Semiconductor of Melborne, Florida part No. HI,1818-5. Each of units 15*a*–15*e* is an eight-to-one multiplexer. Amplifier 93 is a high speed unit gain amplifier which serves as a buffer. Typically, it may be of the type manufactured and sold by National Semiconductor Corporation, 2900 Semiconductor Drive, Santa Clara, California and identified as No. NH0033.

The four bit synchronous binary counters 101, 103, 105 were of the type manufactured and sold by Texas Instruments Incorporated of Dallas, Texas and identified as No. 74163. In FIG. 3, the digital-to-analog converter was of the type manufactured and sold by Datel Systems, Inc. of Canton, Massachusetts and identified as DAC-98BI-300NS. Amplifier 107 was of the type manufactured generally throughout the industry and identified as 741 Op Amp. Amplifiers 115 and 117 were of the type manufactured by Harris Semiconductor and identified as WHA2525 High Speed Op Amps. Amplifier 113 is of the type manufactured and sold by National Semiconductor and identified as LM207 Low Offset Op Amps.

Amplifiers 21*a*–21*q* were of the type manufactured by Fairchild Semiconductor and identified as mike μA760 comparator. In FIG. 4, units 135–138, 143 and 144 comprise an integrated circuit forming two, 2:1 AND-OR invert gates generally manufactured in the industry and identified as 7451 AND-OR invert gates. Units 139–142 and 145 similarly are unitarily packaged and known as 7454 AND-OR invert gates.

Storage latch 150 may be of the type manufactured and sold by Texas Instruments Incorporated and known as 74175 storage latch.

Units 158–160 are unitarily packaged and generally known as an exclusive OR gate manufactured and sold by Texas Instruments Incorporated and identified as 7432 exclusive OR gate. Units 131 and 132 are unitarily packaged and units 133 and 134 similarly are packaged. They are differential line drive units manufactured and sold by Fairchild Semiconductor and identified as No. 9614 line drivers.

Receivers 301–303 were receivers of the type manufactured and sold by Fairchild Semiconductor and identified as 9615 Line Receivers. Counters 304 and 305 were of the type manufactured and sold by Texas Instruments Incorporated and identified as 74191 Counters. Comparator 316 was of the type manufactured and sold by Texas Instruments Incorporated and identified as 7485 Comparator. Digital-to-analog converter 307 was of the type manufactured and sold by Datel Systems, Inc. and identified as DAC-9-8BIR.

Amplifier 309 was of the type manufactured and sold by Motorola and identified as 1458 Dual Op Amp.

Amplifier 310 was of the type manufactured and sold by National Semiconductor and identified as an NH0033 Unit E Gain Buffer.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an optical reader having a scanned photocell array producing a multiplexed analog signal stream by cyclically sampling the signals on channels leading from the cells in said array, the combination which comprises:

a. memory means to store digital coded words, one word for each said channel with each word representative of the relative response of a given channel, b. a multibit analog-to-digital converter to which said stream is applied, c. gain control means for said converter including means cyclically scanning said memory means in synchronism with the multiplexing of said signal channels to generate a stream of gain control voltage levels each level being dependent upon the word stored in memory for a given channel at the time the signal from said given channel passes to said converter to provide a multiplexed digital stream at the output of said converter which is independent of the differences in response of said channels to the same field of view, and d. said converter having a voltage ladder to which said gain control voltages are applied and a plurality of differential amplifiers each connected at one input thereof to receive said signal stream and with connections between a second input thereof at spaced points along said ladder.

2. The combination set forth in claim 1 in which a digital-to-analog converter scans said memory means in synchronism with multiplexing of said analog stream and includes a multiplexer having an input independent of said memory means to vary the conversion scale in said digital-to-analog converter uniformly to modify the output thereof as to all words from said memory.

3. Gain control means for an optical reader wherein a memory unit stores a set of coded words, one word for each channel, representing relative channel responses for a photocell array, which array is sequentially scanned to produce a multiplexed analog stream dependent upon variations in reflectance across the field viewed by said array, comprising:

a. multibit conversion means connected to compare said analog stream and a reference voltage which varies in dependence upon variations in said stored set of response words for producing one multibit output reflectance word for each said photocell channel during each scan cycle, each word being uniquely dependent upon a response word stored in said memory unit, b. background monitor means connected to sense the number of said reflectance words per scan which represent a white background in said field to produce a control signal, and c. means connected to said monitor means effectively to increase and decrease said reference voltage when said control signal respectively is below and above predetermined limits.

4. In an optical reader wherein a set of channel response words are stored, one word for each of a plurality of photocell channels and wherein the differences in the response words represent the differences in response characteristics of said channels to the same field of view, the method which comprises:

a. moving a document through a field viewed by said photocells to produce analog signals on said channels dependent upon variations in reflectance of said documents along a band perpendicular to the direction of movement thereof, b. multiplexing the output of said photocells to provide a first analog voltage stream, c. converting said set of response words to analog form cyclically and sequentially in synchronism with multiplexing the outputs of said photocells to produce a second analog voltage stream, d. converting each element of said first stream to a binary coded word by comparing each said element to the concurrent element of said second voltage stream to provide binary coded reflectance words representative of normalized reflectance of the fields viewed by said photocells, e. counting in each scan cycle of said photocells the number of said reflectance words indicative of white background areas along said band, and f. modifying the amplitude of said second analog voltage stream when the number of reflectance words indicative of the quality of background reflectance differs from a predetermined criteria.

5. The method of claim 4 in which the multiplexing rate is high compared with the rate at which the amplitude of said second analog stream is modified.

* * * * *